United States Patent [19]

Kaite et al.

[11] Patent Number: 4,874,414
[45] Date of Patent: Oct. 17, 1989

[54] ION EXCHANGE PROCESSING METHOD OF GLASS

[75] Inventors: Yoshikazu Kaite; Takashi Yamagishi, both of Hyogo, Japan

[73] Assignee: Nippon Sheet Glass Co., Ltd., Japan

[21] Appl. No.: 248,430

[22] Filed: Sep. 23, 1988

[51] Int. Cl.$^4$ .................... C03C 18/12; C03C 21/00
[52] U.S. Cl. ........................................ 65/20.13
[58] Field of Search ............... 65/30.13, 30.14, 116, 65/33

[56] References Cited

U.S. PATENT DOCUMENTS

| | | |
|---|---|---|
| 3,586,521 | 6/1971 | Duke ........................ 65/33 |
| 3,816,222 | 6/1974 | Plumat et al. ............ 65/30.13 |
| 3,941,474 | 3/1976 | Kitano . | |

Primary Examiner—Peter Kratz
Attorney, Agent, or Firm—Hill, Van Santen, Steadman & Simpson

[57] ABSTRACT

The essential surface of the glass body to undergo the ion exchange processing is coated with the porous layer, which is formed by drying and sintering inorganic fluid, containing clay for more than 3 weight %, so as to have the ion exchange carried out through the above porous layer.

10 Claims, 3 Drawing Sheets

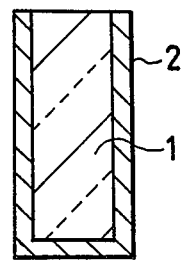
FIG.IA
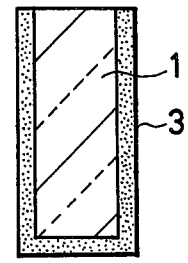
FIG.IB
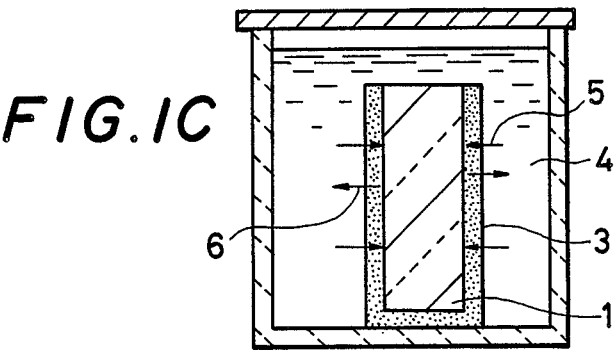
FIG.IC

ION EXCHANGE PROCESSING METHOD OF GLASS

BACKGROUND OF THE INVENTION

1. Field of the Invention

This invention is concerned with the technique for manufacturing the glass body having distribution of ion concentration, and is also concerned particularly with the ion exchange processing method, which is useful for manufacturing large-diameter gradient index lens.

2. Description of the Prior Art

In general, techniques for causing diffusion of specific ions into the glass body, thereby changing properties of the glass body by distribution of such ions are used in manufacturing of gradient index lens, optical waveguide, chemically reinforced glass, etc.

As means of causing diffusion of ions into the glass body as described above, the ion exchange processing method is the simplest, where the medium, such as molten salt, etc., which contains monovalent cations, is made contact with the glass surface and monovalent cations in the glass are exchanged with cations in the above medium.

For example, it is possible to manufacture a gradient index lens, having a distribution of refractive index within the section, which gradually decreases from the center towards the periphery, by having rod-like body fabricated by glass, which contains ion-exchangeable cations, such as Tl, Cs, Li, etc. and also has relatively high refractive index; by immersing this glass rod in molten salt, containing ions which contribute toward reducing the refractive index of the glass, such as Na, K, etc., and by exchanging the above ions in molten salt with ions in the glass.

In the ion exchange processing as described above, diffusion of monovalent cations in the glass is rate-determined. Normally, diffusion rate of these ions is very slow. For example, a long processing time of approximately 10 days would be required to obtain an ion exchange layer of 1 mm or so. This is the greatest disadvantage of this method.

However, since the ion diffusion rate will increase exponentially with temperature, it becomes possible to influence ion exchange in locations deep from the glass body surface in a short time, when the ion exchange processing temperature is increased.

However, when processing temperature becomes high, the viscosity of glass will decrease, thereby causing deformation. For this reason, in the conventional method it was not possible to conduct ion exchange processing at or above the temperature where viscosity falls below $10^{10}$ to $10^{11}$ poise.

Because of these factors, gradient index lenses manufactured using the ion exchange method were of small diameters approximately 3 mm at the maximum. Therefore, it was extremely difficult to mass-produce gradient index lenses of large diameters at low cost using conventional method.

SUMMARY OF THE INVENTION

The essential surface of the glass body, which is to be processed by ion exchange, is covered with a porous layer, formed by drying and sintering inorganic fluid containing more than 3 weight % of clay material, thereby making ion exchange through the above described porous layer.

According to this invention, since ion exchange is made in a condition where the glass body to be processed is coated with and protected by the porous coating layer, there will not occur any deformation in the glass body even if ion exchange is made at high temperatures at which the glass body will deform under the conventional methods. Moreover, there will hardly occur any adhesion between the glass body and the porous layer. For this reason, it is possible to drastically increase the ion exchange processing temperature when compared to the conventional method, thereby sharply reducing the ion exchange processing time and enabling easy manufacturing of gradient index lenses of large diameters, which could not have been obtained under conventional methods.

According to this invention, even if ion exchange processing is made at temperatures still higher than the temperature at which viscosity of the glass becomes $10^7$ to $10^8$ poise, the glass to be processed will not deform, since it is held by the porous coating layer. At the same time there is practically no adhesion between the glass and the porous coating layer. Further, after the processing there is neither exfoliation from the glass body surface nor cracking of the glass.

Accordingly, it is possible to make ion exchange at drastically increased temperatures, thereby reducing ion exchange processing time sharply.

BRIEF DESCRIPTION OF THE DRAWINGS

FIGS. 1A through 1C are sectional views to show one example of reducing this invention to practice by stages.

DETAILED DESCRIPTION OF THE PREFERRED EMBODIMENTS

Figure 2:
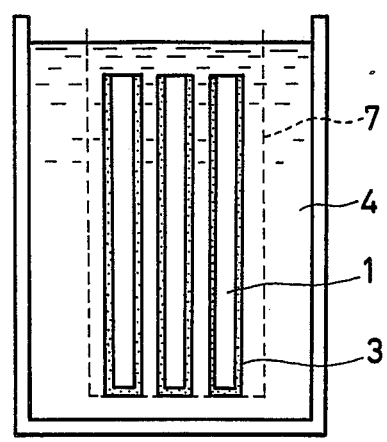
FIG. 2 shows a sectional view of another method of immersion into the ion exchange medium.

The suitable fluid to be used in this invention is a slurry or paste made from clay where one or more than two kinds of materials among silt, fine sand, inorganic fine powders and inorganic fibers are added and mixed as necessary, and kneaded after adding the appropriate quantity of water.

Here, "clay" means a material consisting of grains with grain sizes of less than approximately 2 μm. This clay exhibits plasticity when mixed with a suitable quantity of water and solidifies when heated or dried from the water-moistened state.

Further, "silt" and "fine sand" respectively mean mineral grains with grain sizes of 2 to 20 μm and 20 to 200 μm respectively, and "inorganic fine powder" means finely powdered inorganic compounds, such as $SiO_2$, $Al_2O_3$, $Al(OH)_3$, $TiO_2$, and talc, which is artificially processed or synthesized.

To coat the surface of the glass body, which is to be processed, with a porous layer in this invention, there are the following suitable methods. One method is to coat slurry or paste on the surface of the glass body to be processed by such means as spraying, coating with a trowel or immersing in a liquid and then it is dried and sintered. The other method is that the glass body to be processed is placed in a container made of a porous material (for example, electrolytic diaphragm of high alumina material) having high strength. The empty space between them is then filled with the slurry of coating material. Afterwards it is dried and sintered.

Furthermore, it is also possible to have the slurry of coating material poured into gypsum molds, etc. and the material is dried and sintered, so as to have a container prepared in advance. Then, the above glass body can be inserted into the empty space, having nearly the same form and dimension as the glass body to be processed, which had already been provided in this container.

The sintering temperature at the time of forming the porous coating layer in this invention is one of the important factors.

That is to say, when the above sintering temperature is too low, removal of the bound water contained in clay becomes incomplete, and such bound water becomes water vapor at the time of subsequent ion exchange processing, thereby applying pressure on the surface of the glass body. As a result, it is likely that faults, such as unevenness, and bubbles are generated on the glass body surface. Further, when the sintering temperature is too high, there will be adhesion between the glass body and the porous layer. Even after adequate cooling, it is likely that exfoliations of the glass body surface or a number of cracks on the glass body are generated.

For the foregoing reasons, the above sintering temperature is desired to be in the range of 500° to 1,000° C., and is more preferred to be in the range of 550° to 900° C.

As the coating material forming a porous layer by sintering in this invention, clay is the indispensable constituent. By being more than 3% and preferably more than 5% in weight %, clay will help maintain the appropriate strength when slurry or paste is dried. It will suitably and mutually bond grains, which form a porous body when sintering. The porous layer obtained by sintering the slurry or paste containing clay at the desirable sintering temperatures, as described above, will have extensive form holding strength and will not practically generate any adhesion with the glass body.

The reasons for the above are considered to be due to the following factors. Even if the glass body surface has adhered to the grains making up the porous layer, since the bonding strength between grains is not so high, the grains on the porous layer surface which adhere to the glass body will break away from the porous layer as the glass body cools, probably in the range of temperatures corresponding to deformation temperature and transformation point. As the glass body further cools, the above adhered grains will break away from the glass body surface due to the difference in thermal expansion coefficient. The above phenomena is estimated to be taking place between the glass and the porous layer, even at the time of ion exchange processing in a high-temperature medium. In considering the workability, the form-maintaining strength of the porous layer is desired to be larger. In order not to increase the bonding strength among grains which constitute the porous layer and in order to increase the overall form holding strength, it is effective to mix inorganic fiber material into the slurry or paste of the coating material.

Alternatively, after the slurry or paste is coated on the glass body surface, the above fiber may be coated further on the coated surface.

Further, to adjust the viscosity of the slurry or paste, or to increase the strength of the porous layer after drying in air, it is possible to mix organic matters such as flour or carboxymethylcellulose or inorganic matters such as alumina sol or water glass.

Furthermore, at the time of drying and sintering after the slurry or paste has been coated on the glass body, to expedite removal of moisture contained in the porous layer, the method of flowing low-pressure or dehumidified air as the carrier gas is also suitable The deformation temperature of glass for gradient index lenses, having relatively low melting point, is normally in the range of approximately 520° to 540° C., and in the conventional ion exchange method the deformation temperature is considered to be the upper limit of the ion exchange processing temperature. As a matter of fact, at temperatures beyond the above range, deformations are generated in the glass, thereby making it impossible to make practical lenses. In contrast to the above situations, according to the method under this invention, ion exchange at 900° to 1000° C., some 400° C. higher than the temperature permitted under the conventional method, becomes possible. This will mean that the diffusion speed is increased by some 1,000 times, as estimated from the diffusion speed of normal monovalent cation which relies on the temperature. When this is replaced by the ion exchange processing time, the processing time can be shortened to approximately 1/1000 of the initial value.

Further, it is possible to form the porous layer for holding the glass body, for example, by accumulating fine grains of $SiO_2$, from flame decomposition and hydrolysis of $SiCl_4$, as a layer and by heating and sintering the same until adequate form-maintaining strength is shown, and then by perforation thereof. However, since the porous layer produced by such a method has a very high bonding strength among grains, adhesion will be generated between the glass body and the porous layer as the temperature increases considerably, as described above, thereby making the ion exchange processing impossible.

In contrast to the above, the method under this invention will permit the ion exchange processing at temperatures approximately 300° C. higher, and the diffusion speed is increased by approximately 100 times, and the ion exchange processing time is shortened to approximately 1/100, even when compared to the above method.

Hereinafter, examples which have been reduced to practice, in showing this invention through drawings, will be explained in detail.

In Figs. 1A through 1C, 1 is the glass body to be processed, for example, a glass rod. Firstly, this glass body 1 is coated with the coating material 2 in either slurry or paste for a certain thickness, around the side periphery and on the bottom surface, but leaving the top surface uncoated.

This coating material 2 can be of clay, of clay to which silt, fine sand or inorganic fine powder is added, of material consisting of a mixture of the above at suitable proportions and kneaded after adding the appropriate quantity of water, of material consisting of the above slurry or paste to which inorganic fiber is mixed, or of material consisting of inorganic fiber to which the above slurry is immersed into or the above paste is coated on, and so forth, as a possible means of use.

Then, the above coating material 2 coated on the glass rod surface is sintered at temperatures of 500° to 1000° C., so as to produce the porous coating layer 3.

Then, the above glass rod 1, whose surface, excepting one end, is coated with the porous coating layer 3, is immersed in the ion exchange medium, for example, the molten salt 4, which is maintained at a high temperature, so as to make the ion exchange processing.

In the course of this processing, the monovalent cation 5 contained in the molten salt 4, for example, K ion in case the salt 4 is potassium sulfate, will pass through the connecting, continuous pores of the porous layer 3, so as to contact surface of the glass rod 1, thereby diffusing into the interior from the peripheral surface of the glass rod 1 through the ion exchange with monovalent cation 6 contained in the glass.

After the processing for certain length of time, the concentration of cation 6 in the glass will have a distribution where concentration is maximum at the center and will gradually diminish towards the periphery. Whereas, the concentration of cation 5 invading from outside will have a distribution where concentration is maximum at the surface and will gradually diminish towards the center. With distribution of these concentrated cations 5 and 6, the refractive index of the glass rod 1 will have a distribution, within the section, where the index will gradually diminish or increase from the center towards the periphery.

In the course of the above ion exchange processing, due to rigidity of the porous layer 3, softening deformation of the glass rod 1 is prevented, thereby permitting elevation of the processing temperature, and the processing time can be reduced since the diffusion speed of cations is increased, when compared to the case where the ion exchange processing is made without providing the porous layer 3. Another means of immersing the glass rod coated with the porous layer 3 is shown in FIG. 2.

What is shown in FIG. 2 is the method of immersing a number of glass rods 1 coated with the porous layer, which are contained in the basket 7 made of platinum mesh, into molten salt 4. This method is suitable when the glass rod 1 is long. In this case, after the coating material is coated on the surface of the glass rod 1, a number of glass rods 1 are placed in the basket 7, thereby making the basket 7 serve as the carrier, during the sintering work of coating material and also during the immersing work into the molten salt, which are carried out subsequently.

Figure 3A:
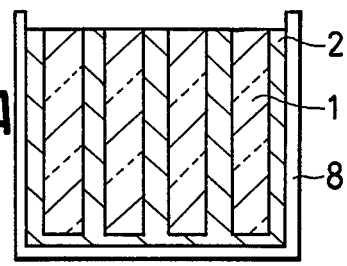
FIGS. 3A through 3C show sectional views of another example of reducing this invention to practice by stages.
Figure 3B:
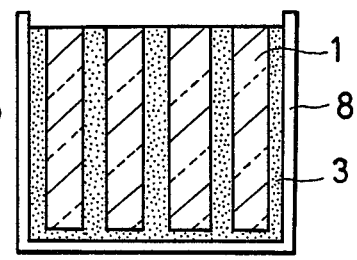
Figure 3C:
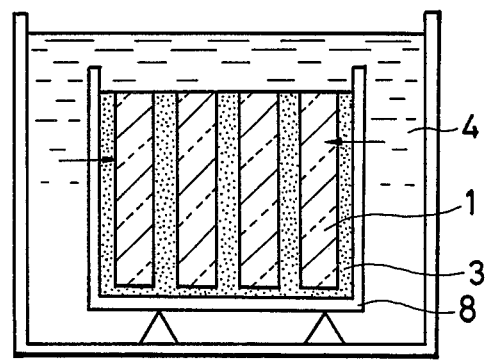

In FIGS. 3A through 3C, another method of forming the porous layer is shown.

In this case, the container 8 for ion exchange is formed with a porous material having connecting, continuous pores, and into this container 8 the slurry of coating material 2 is filled. Within this slurry, a number of glass rods 1 are immersely placed, while leaving a space between the inner walls of the container 8 and also between the rods. At the time of filling the slurry, if the slurry covers the entire rod 1, there will be left no space for absorbing the expansion of the glass, which is generated during the subsequent sintering process, thereby exerting stress on the coating material 2. Therefore, it is undesirable since deformation or cracks will be generated in the coating material 2. For this reason, the quantity of slurry to be filled will be such that the top surface of the rod 1 is left exposed.

The porous container 8 used in the method of the example can be of a porous material, having adequately high grain bonding strength and excellent machinability, for example, electrolytic diaphragm on the market, because it does not contact the glass to be processed, thereby requiring no consideration for possible adhesion with the glass.

Then, after the whole thing is heated at temperatures of 500° to 1000° C., thereby converting the filled coating material 2 into the porous layer 3 by sintering, it is immersed into the molten salt 4 for carrying out ion exchange processing.

Hereinafter, examples of concrete numerical values in this invention are shown.

EXEMPLIFICATION 1

500 g of clay (produced by Kawabata Plant, Nippo Silica Industry Co., Ltd.) and 500 g of talc were thrown into a mixer together with 560 g of water. They were uniformly mixed to produce the paste.

This paste was coated on the glass rod, having a composition shown in Table 1 20.0 mm in diameter and 50 mm in length, with a thickness of approximately 2 mm over the entire surface of the rod, excepting one end thereof.

TABLE 1

| Composition of Glass | | | | | (Unit: mol %) |
|---|---|---|---|---|---|
| $SiO_2$ | $B_2O_3$ | ZnO | $Na_2O$ | $Tl_2O$ | $K_2O$ |
| 62.0 | 3.6 | 15.0 | 9.2 | 8.2 | 2.0 |

It was dried in air for 17 hours after the coating. The temperature was raised from room temperature to 450° C. over a period of 7 hours, and then it was further held at 450° C. for 24 hours, thereby removing the moisture in the coated slurry.

Thereafter, sintering was carried out to remove bound water contained in the clay and in talc, and also to suitably solidify such a mixture. Sintering was carried out successively from the above drying, and the temperature increase from 450° C. to 900° C. was made in 7 hours, then it was held at 900° C. for 24 hours.

However, the molten salt composed of $K_2SO_4$ for 55 mol % and $ZnSO_4$ for 45 mol % was dissolved in a separate container, and this molten salt was poured into the container, in which the above glass was contained. Ion exchange processing was carried out for 7 hours, while maintaining the temperature at 900° C.

With the above processing, thallium and sodium contained in the glass body were ion exchanged with potassium contained in the molten salt through the porous coating layer. After the ion exchange processing for a prescribed period, the glass rod having the porous coating layer was taken out of the container. After washing with water, the porous coating layer on the rod surface was removed, then the glass rod surface was examined, but such defects as exfoliation, cracks, etc. were not observed at all. Furthermore, the diameter of the glass rod was 20.0 mm, and it was confirmed that no deformation was generated throughout its entire length during the processes of drying, sintering and ion exchange. Further, radial distribution of monovalent cation concentration in the glass rod cross section was measured with an X-ray microanalyzer (XMA), where 3.39 mm invasion of potassium ion was confirmed.

As an example for comparison, flame hydrolysis of $SiCl_4$ was carried out with oxyhydrogen gas, where fine grains of $SiO_2$ were accumulated. This was heated for 0.5 hour at 1,300° C. for conversion into a porous body of quartz glass. This porous body was machined to produce a hole, having a diameter of 20.0 mm, thereby making it a holding container. Into this container a glass sample, fabricated to 19.8 mm in diameter and 50 mm in length, having the same property as the one in this exemplification, was inserted, and the ion exchange processing was carried out under the same conditions, using the same molten salt as the one in this exemplification. After the processing, adhesion was observed with the porous body, where the glass surface was exfoliated and there were a number of cracks on the entire glass body.

Furthermore, when the conventional method of ion exchange processing at deformation temperature of glass is used, the diffusion distance of potassium was only 0.028 mm for the processing time of 7 hours at 520° C., which corresponded to the deformation temperature.

EXEMPLIFICATION 2

Four hundred grams of clay, which was the same as the one in Exemplification 1, and 600 g of $TiO_2$ powder, which was a reagent special class, were uniformly mixed, to which 520 g of water containing 2 weight % of alumina sol was added to prepare the paste. This paste was coated on the glass rod, of the same quality and of the same form as the one in Exemplification 1, with a thickness of approximately 2 mm over the entire surface of the rod, excepting one end thereof. It was dried for 24 hours at 450° C. starting at room temperature, then sintering was carried out for 24 hours at 450° to 750° C. Thereafter, the ion exchange processing was carried out for 7 hours at 750° C., using molten salt of KBr. After the processing, the porous coating layer on the rod surface was removed, and the glass rod surface conditions were examined, but no defects were found.

Further, diffusion distance of potassium was examined with XMA and was found to be 2.29 mm.

EXEMPLIFICATION 3

Ninety grams of commercial kaolin (china clay) and 110 g of magnesium hydroxide for chemical use were uniformly mixed, to which 106 g of water was added, which contained 1 weight % of water glass and 5 weight % of carboxymethyl cellulose, thereby forming the paste. This paste was coated on the glass rod, of the same quality and of the same form as the one in Exemplification 1, with a thickness of approximately 2 mm over entire surface of the rod, excepting one end thereof. It was dried for 24 hours at 500° C. starting from room temperature, then sintering was carried out for 24 hours at 500 to 800° C. Thereafter, the ion exchange processing was carried out for 7 hours at 800° C., using molten salt which consisted of KCl for 75% and $K_2SO_4$ for 25% (in terms of mol %). After the processing the porous coating layer was removed, and the glass rod surface was examined, but no defects were found. Further, diffusion distance of potassium was examined with XMA and was found to be 2.87 mm.

EXEMPLIFICATION 4

Four hundred grams of clay (produced by Yunone Plant. Nippo Silica Industry Co., Ltd.), 1,000 g of silt and 600 g of fine sand were thrown into a mixer and 1,400 g of water was added. They were uniformly mixed to produce the slurry. This slurry was poured into an electrolysis diaphram container of high alumina (produced by Nippon Chemical Ceramics Co., Ltd.) on the market, and into this slurry a glass rod, of the composition in Table 1, with diameter of 10 mm and length of 50 mm, was inserted. The container was placed in a decompression furnace, where it was dried and sintered while decompressing to $1 \times 10^4$ Pa.

After the sintering it was immersed in molten salt for carrying out the ion exchange processing.

In the ion exchange processing, the same molten salt as the one in Exemplification 1 was used, and the processing was for 7 hours at 800° C. After the processing, the glass rod was taken out and examined, but no defects were found. Furthermore, diffusion distance of potassium was examined with an XMA and was found to be 2.90 mm.

EXEMPLIFICATION 5

One hundred grams of clay, which was the same as the one in Exemplification 1, and 1,900 g of alumina powder of reagent class 1 were made into slurry by adding 1,300 g of water.

The glass rod, which was processed under the same conditions as in Exemplification 4, excepting the above slurry, was also found to have no defect at all, and the diffusion distance of potassium was 2.90 mm.

EXEMPLIFICATION 6

Two hundred grams of clay, which was the same as the one in Exemplification 4, 1,500 g of commercial kaolin, three hundred grams of alumina powder of reagent class 1 and 1,300 g of water were thrown into a mixer for mixing uniformly, and the slurry obtained was poured into a gypsum mold, to be formed into a container having an accommodating space of 10.0 mm in diameter $\times$ 50 mm in length. After this container was dried, the glass shown in Table 1, which was finished to a diameter of 9.9 mm and length of 50 mm was inserted into the accommodating space of the above container. Sintering was carried out in this condition, then the ion exchange processing was carried out for 7 hours at 800° C., using the molten salt, the same as the one in Exemplification 3. After the processing the glass rod diameter was 10.0 mm for its entire length, and no defect was found on the surface at all. When invasion distance of potassium was measured with the XMA, it was found to be 2.90 mm.

EXEMPLIFICATION 7

To 5 kg of commercial kaolin, 8 kg of water was added to make the slurry. This was spray-coated on the glass shown in Table 1, which was formed into a glass rod with a dimension of 7 mm in diameter and 300 mm in length, sprayed to a thickness of approximately 0.5 mm. After air-drying, it was placed in a basket of platinum mesh, and drying and sintering were carried out. The ion exchange processing was carried out for 29 hours at 700° C., using the molten salt which was the same as the one in Exemplification 1. On the glass after the processing no defects, such as surface exfoliation and cracks were round at all. When this rod was cut into a length of 4 mm and both ends were polished, it was confirmed that a gradient index lens was fabricated.

Contrary to the above results, when a lens having a diameter the same as the above is to be obtained by the conventional ion exchange processing method, a processing period of a little over 1,100 hours (approximately 46 days) would be required.

EXEMPLIFICATION 8

To a mixture of 800 g of clay, which is the same as the one in Exemplification 1, and 200 g of aluminum hydroxide of special class reagent, 1,200 g of water was added to produce the slurry. Into this slurry, a ceramic fiber sheet (Merchandise Name: "Kaowool Ace Paper") was immersed, so as to soak up the above slurry. This sheet was pasted on the glass with a composition shown in Table 1, which was formed into glass sheet of 50 mm×50 mm square and 7 mm in thickness, for the entire surface, excepting one corner thereof. After air-drying, it was placed in a basket of platinum mesh, and drying and sintering were carried out.

Thereafter, the ion exchange processing was carried out for 29 hours at 700° C., using the molten salt which consisted of KI for 86% and $K_2SO_4$ for 14% (in terms of mol %).

No defects, such as exfoliation and cracks were found on the glass sheet after the processing. When the periphery of the glass sheet was cut and polished, it was found that it had been converted into a slab lens, where the refractive index was the maximum at the center in the direction of sheet thickness and was gradually diminishing towards both surfaces.

EXEMPLIFICATION 9

Three hundred grams of clay (clay contained in Matsuyama silica), 690 g of aluminum oxide powder of reagent class 1 and 10 g of silica fiber, having a diameter of 10 μm and in average length of 15 mm, were thrown into a mixer. A further 560 g of water was added to prepare the paste. This paste was coated with a trowel on the entire surface, except the end of the glass rod, being 20.0 mm in diameter and 50 mm in length, and with a composition of $SiO_2$ for 60%, ZnO for 20%, $Na_2O$ for 10% and $Tl_2O$ for 10% (in terms of mol %) containing 0.6 weight % of $Sb_2O_3$ as a refining agent.

After air-drying, drying and sintering were carried out. The ion exchange processing was carried out for 24 hours at 730° C. in molten salt consisting of KBr for 77% and $K_2SO_4$ for 23% (in terms of mol %). Thereafter, the glass rod with the porous coating layer was placed in an annealing furnace, and slow cooling was done.

When the glass rod surface, after removal of the porous coating layer, was examined, no defects, such as exfoliation and cracks were found.

Further, when examination was made with an XMA invasion distance of potassium reached as much as 3.80 mm.

What is claimed is:

1. An ion exchange processing method of glass, where a glass body and a media containing monovalent cation are contacted, thereby exchanging such cation with a monovalent cation contained in the glass body, characterized by having an essential surface of said glass body coated with an inorganic porous layer formed by drying and sintering a slurry or paste, which contains more than 3 weight % clay, and by carrying out the ion exchange through said porous layer and, thereafter removing said porous layer from the glass body.

2. A method according to claim 1, where said porous layer is coated on said glass body surface in a slurry or paste condition, and thereafter such layer is formed by drying and sintering.

3. A method according to claim 1, where said porous layer is filled into an empty space between a porous container for accommodating said glass body to be processed and said above glass body, in a slurry or paste condition, and thereafter such layer is formed by drying and sintering.

4. A method according to any one of claims 1 to 3, where said sintering temperature is 500° C. to 1,000° C.

5. A method according to any one of claims 1 to 3, where at least one among silt, fine sand and inorganic fine powder is mixed, in addition to clay, in said slurry or paste.

6. A method according to any one of claims 1 to 3, where inorganic fiber material is mixed in said slurry or paste.

7. A method according to claim 4, where at least one among silt, fine sand and inorganic fine powder is mixed, in addition to clay, in said slurry or paste.

8. A method according to claim 4, where inorganic fiber material is mixed in said slurry or paste.

9. A method according to claim 5, where inorganic fiber material is mixed in said slurry or paste.

10. A method according to claim 6, where inorganic fiber material is mixed in said slurry or paste.

* * * * *